UNITED STATES PATENT OFFICE.

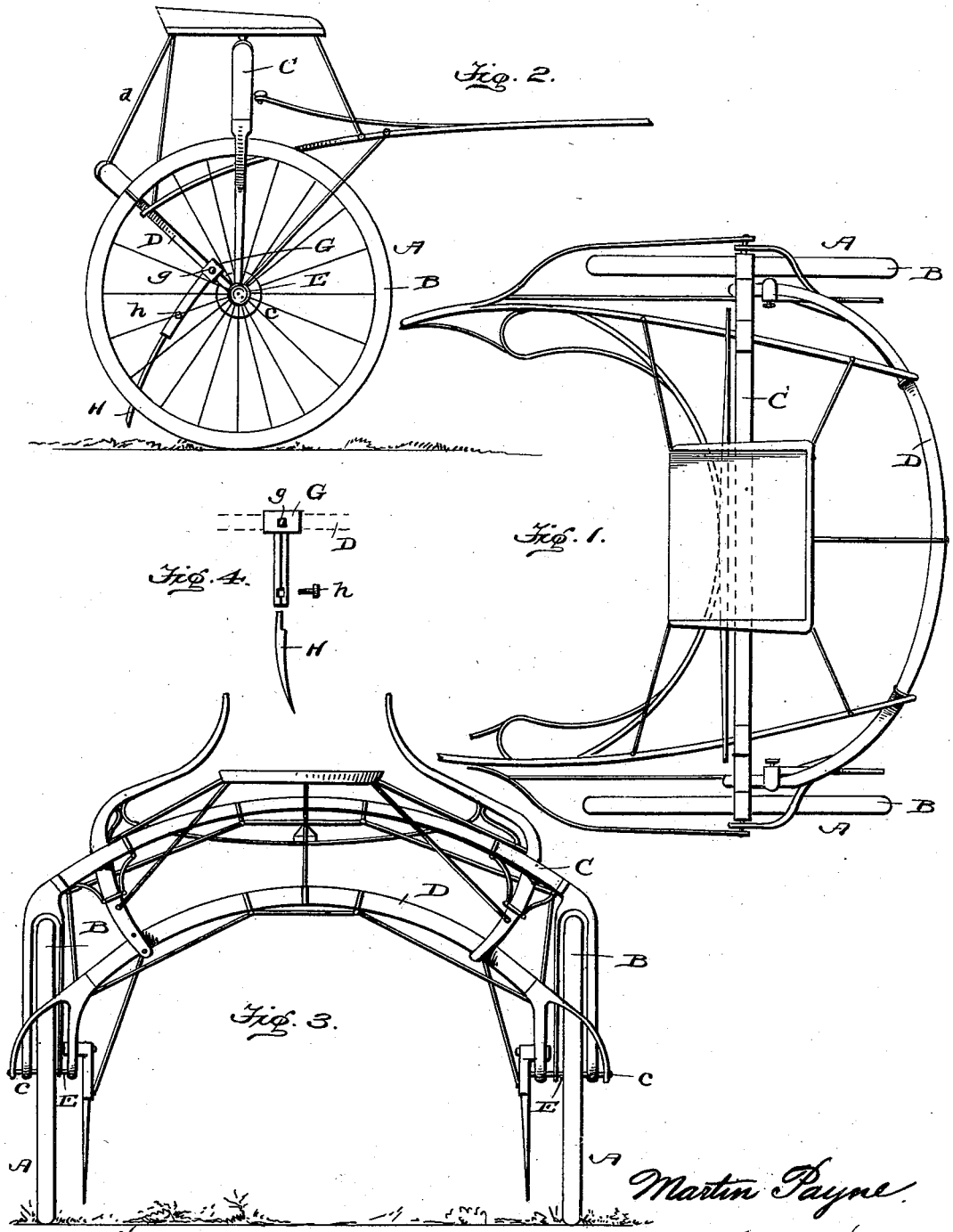

MARTIN PAYNE, OF TROY, NEW YORK.

TROTTING-SULKY.

SPECIFICATION forming part of Letters Patent No. 506,186, dated October 3, 1893.

Application filed June 9, 1893. Serial No. 477,050. (No model.)

*To all whom it may concern:*

Be it known that I, MARTIN PAYNE, a citizen of the United States, residing at Troy, in the county of Rensselaer and State of New York, have invented certain new and useful Improvements in Trotting-Sulkies; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain improvements in the construction of trotting sulkies designed more particularly with a view to the use of elastic or pneumatic tires, and the object of the invention is to provide an improved construction which will permit of the use of wheels of larger diameter than ordinarily used while at the same time presenting a framework of extreme rigidity adapted to prevent swaying and springing, and increasing the ease with which the sulky may be drawn.

I have illustrated a sulky constructed in accordance with my invention in the accompanying drawings in which—

Figure 1 is a plan view of the sulky. Fig. 2 is a side elevation of the same, and Fig. 3 is an end view. Fig. 4 is a detail view of the brake.

Referring more particularly to the drawings A, A, represent the wheels of the sulky which in this instance are shown as the ordinary form of suspension wheel provided with pneumatic tires B. These wheels are connected together by two axles C, D, the former of which extends directly over the center of the wheels and as shown in the rear elevation, has its ends curved downwardly and extended to the hubs of the wheels upon the outside where it is connected with the outer ends of the shafts upon which the wheels are journaled. The other axle D, is located in rear of the former, and lies in an inclined plane with its upper portion preferably some eighteen inches lower than the upper portion of the axle C, to which it is connected by suitable bracing. This rear axle is also of inverted U shape and has the ends of its arms terminating in proximity to the hubs of the wheels upon the inside, where the said ends are connected to the inner ends of the shafts E, of the wheels.

The shafts are so arranged that they are below the level of the tops of the wheels. They are passed through under or over the axle C, as shown at c, in the side elevation, to which they are secured in the ordinary or any desired manner; and thence they are passed to the rear with their ends terminating above the rear axle where they are secured firmly as shown at d.

The axles above described are designed to be made of steel tubing, aluminium, or similar material designed to provide lightness and strength combined, and the double arrangement of the axles, terminating one at the hubs on the inside of the wheels, and the other at the hubs on the outside of the wheels and connected by suitable bracing, provides an exceedingly rigid frame. The increased strength of the frame thus constructed enables me to use wheels of much greater diameter, thus causing the sulky to run much more easily as the tread or bearing point of the tires upon the ground is much greater and there is less tendency of the tires to flatten at that point.

By the arrangement of the shafts also passing under or over the forward axle and being secured above the rear axle, but below the level of the tops of the wheels a much more direct draft is secured, this also adding to the ease with which the sulky may be drawn.

I have found in the ordinary forms of sulkies that when a horse rears up in the shafts the wheels are drawn forward against or under the horses legs, thus endangering the life of the driver. To obviate this I have provided the brake or brace illustrated in detail in Fig. 4. This consists of a tubular iron rod or socket piece G, secured by means of a bolt g, to the rear axle near the hubs on each side, and in which slides a pointed rod H, which is adjusted and held in proper position by a set screw h. It will thus be seen that as the horse rises in the shafts the point of the brake will engage with the ground and prevent the forward movement of the wheels.

Having thus described my invention, what I claim is—

1. A sulky having a forward axle section vertically disposed and a rear axle section inclined with reference thereto, and adjustable brake rods secured to the rear axle section.

2. A trotting sulky having a forward axle section extending over the wheels with its ends terminating at the hubs upon the outside thereof, and a rear inclined axle section with its ends terminating at the hubs at the inside thereof, with suitable bracing connecting said axles, substantially as described.

3. In a trotting sulky the combination with a forward axle section and a rear inclined axle section with the wheels journaled between the ends thereof, of the shafts passing under or over the forward axle section and secured thereto and having their rear ends secured above the rear axle section, substantially as described.

4. A sulky having a forward axle section vertically disposed and a rear axle section inclined with reference thereto, a socket or sockets carried by the rear axle section and a brake rod or rods adjustable in the socket or sockets.

5. A sulky having a forward axle section and a rear axle section, shafts connected with the forward and rearward axle section, and a brake carried by the rear axle section.

6. A sulky having the curved vertically disposed forward axle section, the curved rear axle section inclined with reference thereto, shafts connected to each axle section, and wheels journaled in each axle.

7. A sulky consisting of the seat, the vertically disposed fore axle section having forked ends, the inclined rear axle section having forked ends, the wheels journaled in said forked ends of both axle sections, and the shafts connected to both axle sections.

In testimony whereof I affix my signature in presence of two witnesses.

MARTIN PAYNE.

Witnesses:
CHARLES E. LANSING,
J. E. B. PAYNE.